(12) United States Patent
Salma et al.

(10) Patent No.: US 6,663,841 B2
(45) Date of Patent: Dec. 16, 2003

(54) REMOVAL OF $H_2S$ AND/OR MERCAPTANS FORM SUPERCRITICAL AND/OR LIQUID $CO_2$

(75) Inventors: Tauseef Salma, Stafford, TX (US); Doug Elledge, Yucon, OK (US); Paula Kolb, The Woodlands, TX (US); Scot Haines, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 40 days.

(21) Appl. No.: 10/125,878

(22) Filed: Apr. 18, 2002

(65) Prior Publication Data

US 2003/0198585 A1 Oct. 23, 2003

(51) Int. Cl.[7] .............................................. C01B 31/20
(52) U.S. Cl. ................ 423/437.1; 423/242.2; 423/242.4; 252/182.11; 252/182.12; 252/184
(58) Field of Search ............................ 423/437.1, 242.2, 423/242.4; 252/182.11, 182.12, 184

(56) References Cited

U.S. PATENT DOCUMENTS

| | | | |
|---|---|---|---|
| 2,594,269 A | * 4/1952 | Geisel ..................... 423/437.1 |
| 4,206,610 A | * 6/1980 | Santhanum ..................... 62/55 |
| 4,460,395 A | * 7/1984 | Nobles et al. .................. 62/18 |
| 4,748,011 A | 5/1988 | Baize ......................... 423/228 |
| 4,978,512 A | 12/1990 | Dillon ........................ 423/226 |

OTHER PUBLICATIONS

E. T. Dillon, "Gas Sweetening With a Novel and Selective Hexahydrozine," GRI 4th Sulfur Recovery Conference, Austin, Texas, 1992, pp. 373–403.

T. Salma, "Effect of Carbon Dioxide on Hydrogen Sulfide Scavenging," 2000 SPE Permian Basin Oil and Gas Recovery Conference, Midland, Texas SPE 59765, Mar. 21–23, 2000, pp. 1–5.

* cited by examiner

*Primary Examiner*—Stanley S. Silverman
*Assistant Examiner*—Timothy C. Vanoy
(74) *Attorney, Agent, or Firm*—Madan, Mossman & Sriram, P.C.

(57) ABSTRACT

A method for removing or scavenging hydrogen sulfide ($H_2S$) and/or mercaptans from supercritical and/or liquid carbon dioxide ($CO_2$) using triazine scavenging agents is described. Preferred triazines are hexahydrotriazines.

18 Claims, No Drawings

REMOVAL OF H₂S AND/OR MERCAPTANS FORM SUPERCRITICAL AND/OR LIQUID CO₂

FIELD OF THE INVENTION

The invention relates to removing or scavenging hydrogen sulfide ($H_2S$) and/or mercaptans from carbon dioxide ($CO_2$), and most particularly relates, in one non-limiting embodiment, to removing or scavenging $H_2S$ from liquid and/or super-critical $CO_2$.

BACKGROUND OF THE INVENTION

Carbon dioxide is widely used in secondary and tertiary recovery of oil and natural gas in oil field applications. Prior to injection, $CO_2$ is processed and purified in processing plants and compressed to about 1800 to 2000 psig (about 12,000 to 14,000 kPa) for distribution and injection. To comply with some governmental regulations, the $H_2S$ concentration of $CO_2$ to field injection points is required to be less than 100 ppm.

Some of the plants processing and purifying $CO_2$ are operating at their maximum capacity for handling $CO_2$ and effectively removing $H_2S$ to maintain $H_2S$ concentrations at less than 100 ppm. The primary limitation of some plants is their capacity to remove $H_2S$ to an outlet concentration of less than 100 ppm. Operators of such facilities may experience a peak in gas production resulting in an increased requirement in capacity to handle the volume of $CO_2$ produced. The cost for making mechanical changes to these existing plants may require several million dollars and take a year or more. A chemical treatment would be a desirable alternative to making such a capital investment. Under these conditions, such plants cannot handle the increased production. Hence, the additional volume of $CO_2$ cannot be processed and $H_2S$ cannot be removed from the $CO_2$ thus preventing the use of the additional $CO_2$ for further recovery of hydrocarbons.

It is known to use triazines to selectively remove $H_2S$ from natural gas in the presence of $CO_2$. Tauseef Salma in "Effect of Carbon Dioxide on Hydrogen Sulfide Scavenging," SPE 59765, 2000 SPE Permian Basin oil and Gas Recovery Conference, Midland, Tex. 21–23 March 2000, studied the effect of $CO_2$ on the $H_2S$ scavenging capacity of triazine-based scavengers for removing $H_2S$ from natural gas. She concluded that $CO_2$ has very little effect on the $H_2S$ scavenging performance of a triazine based $H_2S$ scavenger.

U.S. Pat. No. 4,978,512 describes methods for selectively reducing the levels of hydrogen sulfide and organic sulfides from gaseous and/or liquid hydrocarbon streams, particularly natural gas streams, comprising contacting the streams with a composition comprising the reaction product of (i) a lower alkanolamine with (ii) a lower aldehyde. The reaction product of formaldehyde with monoethanolamine is 1,3,5-tri-(2-hydroxyethyl)-hexahydro-S-triazine.

Thus, it would be desirable if a method for removing or scavenging $H_2S$ from carbon dioxide in liquid and/or super-critical form could be discovered which involved simply adding a chemical scavenger to the carbon dioxide.

SUMMARY OF THE INVENTION

An object of the invention is to provide a method for scavenging or removing $H_2S$ from liquid and/or supercritical $CO_2$.

An additional object of the invention includes providing a method for scavenging or removing $H_2S$ from liquid and/or supercritical $CO_2$ that may be accomplished by adding an effective amount of a chemical scavenging agent to the carbon dioxide.

Another object of the invention is to provide a scavenging agent for removing $H_2S$ from liquid and/or supercritical carbon dioxide where the scavenging agent is easily made.

In carrying out these and other objects of the invention, there is provided, in one form, a method for scavenging a sulfur compound such as $H_2S$ and/or a mercaptan from carbon dioxide which can either be liquid $CO_2$, supercritical $CO_2$, and mixtures thereof. The method involves adding to the $CO_2$ an effective amount of a triazine to scavenge at least a portion of the $H_2S$.

DETAILED DESCRIPTION OF THE INVENTION

It has been discovered that triazines and particularly hexahydrotriazines can effectively scavenge $H_2S$ from liquid and/or supercritical $CO_2$ itself. The invention was discovered while resolving the problem of handing the additional volume of $CO_2$ in a plant by removing the $H_2S$ corresponding to the increased production. While triazines are widely used in the natural gas industry for removal of $H_2S$, and also used in removing $H_2S$ in tail gas processing where the tail gas comprises gaseous $CO_2$, the application of non-regenerable chemical liquid scavengers such as triazines has not been known or documented for the removal of $H_2S$ from super-critical and liquid carbon dioxide prior to this invention. This is a very specialized application due to the fact that under supercritical conditions, $CO_2$ exists as a single fluid phase.

The work done on the inventive method investigated the actual removal of $H_2S$ from supercritical $CO_2$ at high partial pressures of $CO_2$.

While many triazines are expected to be useful in the method of this invention, suitable hexahydrotriazines may have the formula:

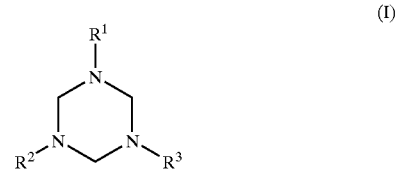

(I)

where $R^1$, $R^2$ and $R^3$ are independently selected from the group consisting of straight or branched alkyl groups, substituted or unsubstituted with hydroxyl groups, where the alkyl groups average from about 1 to about 20 carbon atoms, preferably from about 1 to about 5 carbon atoms. Triazines, such as the preferred hexahydrotriazines of the invention, are readily made by reacting formaldehyde with a primary amine or an alkanolamine where the amine is primary. Suitable reactants with formaldehyde include amines of the formula $H_2NR^x$ where $R^x$ can be defined as $R^1$, $R^2$, and $R^3$ above. In one non-limiting embodiment, the preferred hexahydrotriazines include, but are not necessarily limited to, 1,3,5-tri-(2-hydroxyethyl)-hexahydro-S-triazine; 1,3,5-trimethylhexahydro-1,3,5-triazine; or mixtures thereof.

It is not always possible to predict with precision what the effective proportions of triazine are in removing or scavenging at least a portion of the $H_2S$ from supercritical or liquid $CO_2$ since such dosage is typically dependent upon a number of complex, interrelated factors including, but not necessarily limited to, the partial pressure of the $CO_2$, the temperature of the $CO_2$, the particular nature of the triazine or blend of triazines if a blend is used, and the like. Nevertheless, in an effort to illustrate what an effective amount range may be, an effective amount of triazine ranges from about 1 to about 100 parts per part sulfur compound in the carbon dioxide on a weight basis. Preferably, the effective amount of triazine ranges from about 3 to about 20 parts per part sulfur compound, most preferably from about 3 to about 15 parts per part sulfur compound. These triazine scavengers have been shown to remove 1–2 pounds of $H_2S$ per gallon of triazine (120–240 $kg/m^3$) from supercritical/liquid $CO_2$, in one non-limiting embodiment of the invention.

In another non-limiting embodiment of the invention, the amount of $H_2S$ in the liquid or supercritical $CO_2$ is reduced to less than 100 ppm, preferably less than about 80 ppm.

In application, the invention is a process for removing $H_2S$ from supercritical $CO_2$ in a flow line using a triazine-based $H_2S$ scavenger. A method such as the following may be used, in one non-limiting embodiment.

A suitable injection point is selected for the scavenger injection preferably as far upstream of the monitoring point as possible.

The scavenger is then pumped into the target flow line via a high-pressure, positive displacement pump, using an injection quill and a pulsation dampener.

In turbulent flow regime, the scavenger will be homogeneously distributed into the main body of the fluid, and such regime provides efficient mixing.

In the presence of efficient mixing and optimized injection set-up, triazine-based scavenger will react irreversibly with $H_2S$ and form liquid reaction products.

The $H_2S$ concentration in the $CO_2$ upstream from the injection point could be measured to establish the injection rate. The continuous scavenger injection rate could be continuously adjusted using a conventional feedback loop control system either from the upstream monitoring point, or a downstream monitoring point, or both.

In general, the triazine scavengers are water-soluble and are delivered in water as a solvent. Any other suitable solvent may also be used. The inventive process is applicable for removal of $H_2S$ from liquid and/or supercritical $CO_2$ under conditions of temperature and pressure where injection of the treatment chemical does not increase the water content above its water saturation limit. For example, at 1200 psig (8300 kPa) and 70° F. (21° C.), the saturation limit is 130 pounds of water per MMSCF of $CO_2$ (2.1×10–3 $kg/m^3$), in one non-limiting embodiment of the invention. The volume of scavenger that can be injected should not introduce water exceeding the saturation point. The presence of any free water can cause very high corrosion rates in mild steel pipelines.

The triazine scavengers of this invention can remove $H_2S$ from liquid and/or supercritical $CO_2$ at a wide range of temperatures and pressures, however; in general, the efficiency of the triazine scavengers increases with increasing temperatures and pressures.

As noted, carbon dioxide injection is widely used for secondary and tertiary recovery of hydrocarbons. Removal of $H_2S$ from liquid and/or supercritical $CO_2$ will provide a cost effective treatment method to increase the volume of $CO_2$ processed and used for injection into the formation that will yield improved recovery of the hydrocarbons.

The invention will be further illustrated with respect to the following Examples, which are not intended to limit the invention in any way but rather are included to give a better sense of the invention.

EXAMPLES 1–3

Removal of $H_2S$ from Liquid $CO_2$ Using 1,3,5-Triazine

A mixture of liquid $CO_2$ containing 500 ppm $H_2S$ was blended in a 1000 cc bomb at 825 psig (5,690 kPa). The $CO_2$ was transferred from the pressure bomb to test pressure cells each having a volume of about 30 ml (30 cc). A first cell was maintained as a control and no scavenger was added to it.

To a second test cell was added 3 ml of a 1% 1,3,5-tri-(2-hydroxyethyl)-hexahydro-S-triazine scavenger, abbreviated herein as 1,3,5-triazine. The effective concentration of the 1,3,5-triazine was about 1000 ppm. The liquid $CO_2$ mixed with 500 ppm $H_2S$ from the pressure bomb was used to fill the second test cell to the point where pressure equilibrated between the cell and the bomb. After the test cell was disconnected from the pressure bomb, the cell was shaken 50 times before placing it in a hood. The $H_2S$ concentration in the gas phase was measured using Sensidyne stain tubes. A third test cell was employed in a similar manner using a higher concentration of 1,3,5-triazine scavenger. The results are presented in Table I:

TABLE I

Removal of $H_2S$ From Liquid $CO_2$ at 825 psig (5,690 kPa), 70° F. (21° C.) Using 1,3,5-Triazine Scavenger

| Ex. No. | 1,3,5-Triazine, ppm | Time, hours | $H_2S$ content, ±10 ppm |
|---|---|---|---|
| 1 (control) | 0 | 0 | 500 |
| | | 5 | 500 |
| | | 10 | 500 |
| 2 | 1,000 | 0 | 520 |
| | | 5 | 300 |
| | | 10 | 240 |
| 3 | 3,000 | 0 | 500 |
| | | 5 | 0 |
| | | 10 | 0 |

From Example 2, it was calculated that the ratio of 1,3,5-triazine to $H_2S$ removed was about 3.57:1, on a weight basis. From Example 3, the ratio of 1,3,5-triazine to $H_2S$ removed was about 6:1.

The experimental set-up used for these Examples was in essence a static system. However, in an actual system, $CO_2$ would be flowing in turbulent flow (Reynolds number>$10^6$, velocity approximately 6.8 ft/s (2.1 m/s), in a non-limiting embodiment), which would facilitate the mixing of the $CO_2$ with the scavenger. High velocities and efficient mixing should provide a significantly faster rate of $H_2S$ removal. In natural gas applications, significant reductions in $H_2S$ concentrations have been observed at contact times on the order of a few seconds to a few minutes, depending upon the operating conditions of the system. For example, if the distance between the injection point and the header where sweet $CO_2$ blends with the treated plant $CO_2$ is approximately 2000 ft (610 m), then $CO_2$ moving at a velocity of 6.8 ft'sec (2.1 m/s) will be in contact with the triazine scavenger for approximately 260 seconds.

These results clearly demonstrate that with sufficient contact time and at sufficient dosage, 1,3,5-triazine can remove $H_2S$ from liquid $CO_2$. It is expected that the triazines of this invention can remove other sulfur compounds from liquid or supercritical $CO_2$ besides $H_2S$, such as mercaptans.

EXAMPLE 4

A field trial with the 1,3,5-triazine of Examples 1–3 was conducted on a line carrying supercritical $CO_2$. This line had characteristics similar to those expected at a plant injection point. Test results confirmed that given sufficient mixing by velocity and contact time 1,3,5-triazine successfully selectively scavenged $H_2S$ in supercritical $CO_2$. However, variations in the incoming $H_2S$ levels (ranging from 80 to 117 ppm $H_2S$) and limitations of selected experimental setup prevented determination of the efficiency of the reaction.

Many modifications may be made in the composition and implementation of this invention without departing from the spirit and scope thereof that are defined only in the appended claims. For example, the exact triazine used may be different from those used here. Blends of triazines are also expected to be useful. Further, sulfur compounds other than $H_2S$ are expected to be removed from liquid or supercritical $CO_2$ using the triazines of this invention. Additionally, application conditions other than those specifically exemplified herein are anticipated to be environments in which the inventive method will find success.

We claim:

1. A method for scavenging a sulfur compound from carbon dioxide selected from the group consisting of liquid $CO_2$, supercritical $CO_2$, and mixtures thereof comprising adding to the carbon dioxide an effective amount of a triazine to scavenge at least a portion of the sulfur compound, where the sulfur compound is selected from the group consisting of $H_2S$ and mercaptans.

2. The method of claim 1 where the triazine is a hexahydrotriazine.

3. The method of claim 1 where the triazine has the formula:

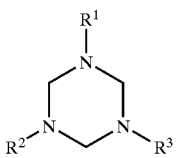

(I)

where $R^1$, $R^2$ and $R^3$ are independently selected from the group consisting of straight or branched alkyl groups, substituted or unsubstituted with hydroxyl groups, where the alkyl groups average from about 1 to about 20 carbon atoms.

4. The method of claim 3 where the hexahydrotriazine is selected from the group consisting of 1,3,5-tri-(2-hydroxyethyl)-hexahydro-S-triazine; 1,3,5-trimethylhexahydro-1,3,5-triazine; and mixtures thereof.

5. The method of claim 1 where the amount of sulfur compound is reduced to less than 100 ppm.

6. A method for scavenging a sulfur compound from carbon dioxide selected from the group consisting of liquid $CO_2$, supercritical $CO_2$, and mixtures thereof comprising adding to the carbon dioxide a hexahydrotriazine to scavenge at least a portion of the sulfur compound, where the amount of hexahydrotriazine ranges from about 1 to about 100 parts per part sulfur compound, where the sulfur compound is selected from the group consisting of $H_2S$ and mercaptans.

7. The method of claim 6 where the hexahydrotriazine has the formula:

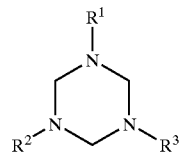

(I)

where $R^1$, $R^2$ and $R^3$ are independently selected from the group consisting of straight or branched alkyl groups, substituted or unsubstituted with hydroxyl groups, where the alkyl groups average from about 1 to about 20 carbon atoms.

8. The method of claim 7 where the hexahydrotriazine is selected from the group consisting of 1,3,5-tri-(2-hydroxyethyl)-hexahydro-S-triazine; 1,3,5-trimethylhexahydro-1,3,5-triazine; and mixtures thereof.

9. The method of claim 6 where the amount of sulfur compound is reduced to less than 100 ppm.

10. A carbon dioxide composition selected from the group consisting of liquid $CO_2$, supercritical $CO_2$, and mixtures thereof comprising an effective amount of a triazine to scavenge at least a portion of a sulfur compound that is present, where the sulfur compound is selected from the group consisting of $H_2S$ and mercaptans.

11. The composition of claim 10 where the triazine is a hexahydrotriazine.

12. The composition of claim 10 where the triazine is a hexahydrotriazine having the formula:

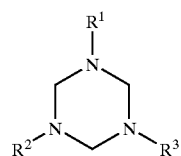

(I)

where $R^1$, $R^2$ and $R^3$ are independently selected from the group consisting of straight or branched alkyl groups, substituted or unsubstituted with hydroxyl groups, where the alkyl groups average from about 1 to about 20 carbon atoms.

13. The composition of claim 12 where the hexahydrotriazine is selected from the group consisting of 1,3,5-tri-(2-hydroxyethyl)-hexahydro-S-triazine; 1,3,5-trimethylhexahydro-1,3,5-triazine; and mixtures thereof.

14. The composition of claim 10 where the amount of sulfur compound present is less than 100 ppm.

15. A carbon dioxide composition selected from the group consisting of liquid $CO_2$, supercritical $CO_2$, and mixtures thereof comprising a hexahydrotriazine to scavenge at least a portion of a sulfur compound that is present, where the amount of hexahydrotriazine ranges from about 1 to about 100 parts per part sulfur compound, where the sulfur compound is selected from the group consisting of $H_2S$ and mercaptans.

16. The composition of claim 15 where the hexahydrotriazine has the formula:

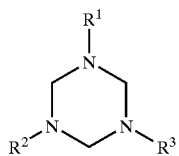 (I)

where R¹, R² and R³ are independently selected from the group consisting of straight or branched alkyl groups, substituted or unsubstituted with hydroxyl groups, where the alkyl groups average from about 1 to about 20 carbon atoms.

17. The composition of claim 15, where the hexahydrotriazine is selected from the group consisting of 1,3,5-tri-(2-hydroxyethyl)-hexahydro-S-triazine; 1,3,5-trimethylhexahydro-1,3,5-triazine; and mixtures thereof.

18. The composition of claim 15 where the amount of sulfur compound present is less than 100 ppm.

* * * * *

UNITED STATES PATENT AND TRADEMARK OFFICE
CERTIFICATE OF CORRECTION

PATENT NO. : 6,663,841 B2
DATED : December 16, 2003
INVENTOR(S) : Tauseef Salma et al.

It is certified that error appears in the above-identified patent and that said Letters Patent is hereby corrected as shown below:

Title page,
Item [54], Title, please delete "FORM" and insert therefor -- FROM --.

Column 3,
Line 49, please delete "2.1x10-3" and insert therefor -- $2.1 \times 10^{-3}$ --.

Column 4,
Line 57, please delete "ft'sec" and insert therefor -- ft/sec --.

Signed and Sealed this

Twenty-ninth Day of June, 2004

JON W. DUDAS
*Acting Director of the United States Patent and Trademark Office*